United States Patent [19]

Lang et al.

[11] 4,002,144
[45] Jan. 11, 1977

[54] INSTALLATION FOR COATING SUBSTANTIALLY U-SHAPED OR V-SHAPED ARTICLES

[75] Inventors: Marcello Lang, Milan; Leonaldo Ansaldo, S. Alessio (Lucca), both of Italy

[73] Assignee: Ato Chimie, Courbevoie, France

[22] Filed: May 8, 1975

[21] Appl. No.: 575,706

[30] Foreign Application Priority Data

July 17, 1974 France .............................. 74.24797

[52] U.S. Cl. .................................. 118/630; 118/58; 118/406
[51] Int. Cl.² ........................................ B05C 19/02
[58] Field of Search ............ 118/641, 58, 642, 643, 118/308, 624, 406, 630, 324, 423; 198/41, 103, 25, DIG. 13

[56] References Cited

UNITED STATES PATENTS

| | | | |
|---|---|---|---|
| 2,623,802 | 12/1952 | Bulk | 198/41 X |
| 2,858,008 | 10/1958 | Dilts | 198/287 |
| 3,164,081 | 1/1965 | Vincze | 198/41 X |
| 3,452,714 | 7/1969 | Burke et al. | 118/308 X |
| 3,589,926 | 6/1971 | Eckert et al. | 118/404 X |
| 3,695,909 | 10/1972 | Fabre et al. | 118/404 X |
| 3,795,224 | 3/1974 | Batson et al. | 118/308 |

*Primary Examiner*—John P. McIntosh
*Attorney, Agent, or Firm*—Burgess Ryan and Wayne

[57] ABSTRACT

An installation for coating substantially U-shaped or V-shaped articles, such as hairpins, curlers and similar items includes treatment stations comprising a coating station at which a powderous plastic material is applied onto those portions of the objects which are to be coated, a heating station at which the said portions of the objects are heated to a temperature at which said powderous plastic material melts, and conveying means for conveying said objects to said stations. The installation according to the instant invention comprises at its inlet end inlet means for introducing in bulk the objects to be coated into said installation, pick-up means for separately picking up said objects one by one, and orienting and feeding means for feeding said objects to said coating stations, at least a part of said orienting and feeding means being adapted to mask the remaining portions of said objects, which are not to be coated.

3 Claims, 6 Drawing Figures

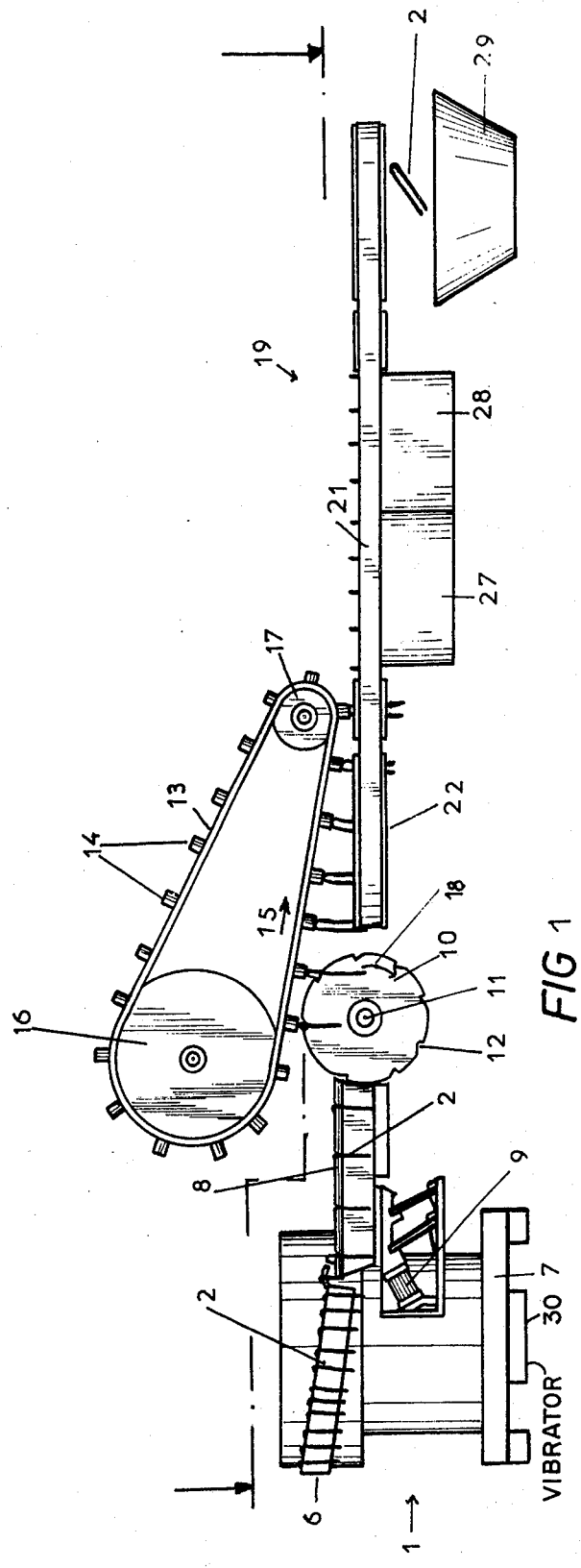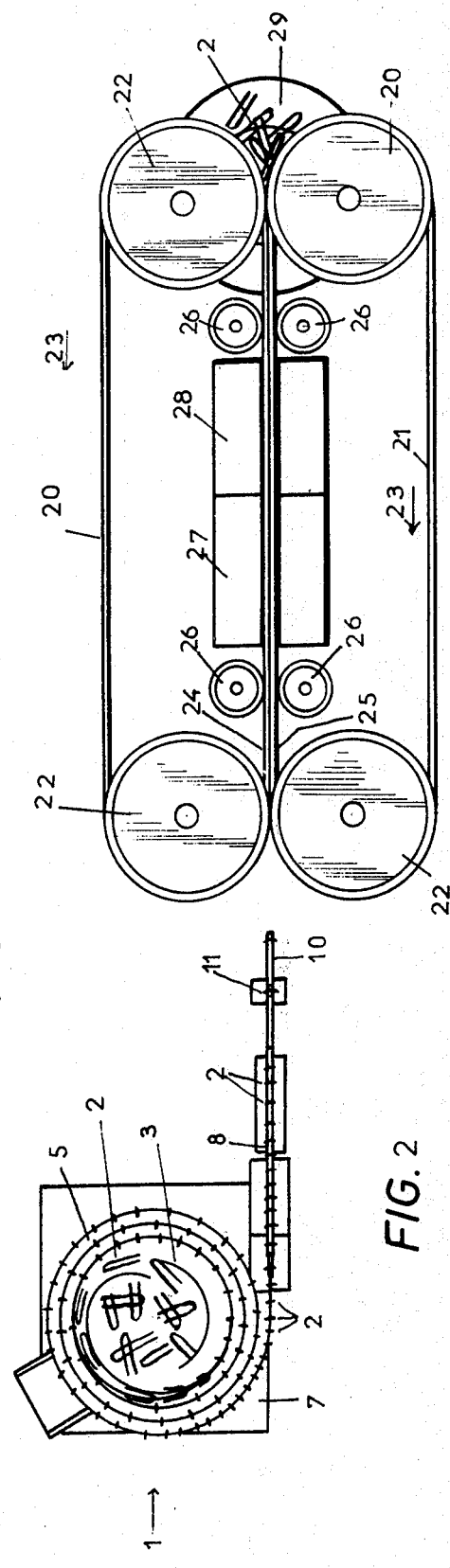
FIG. 1
FIG. 2

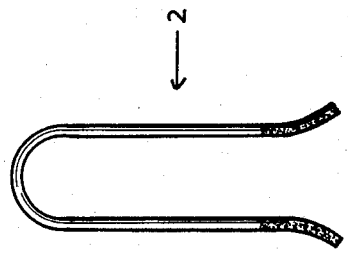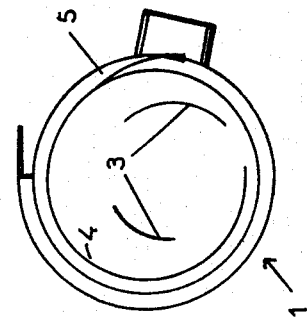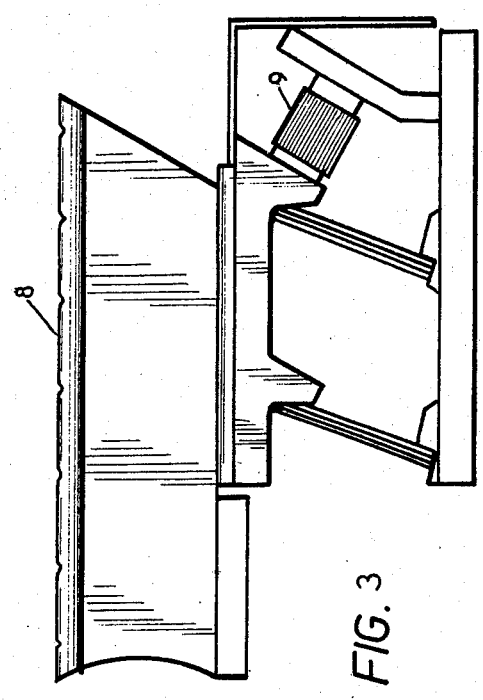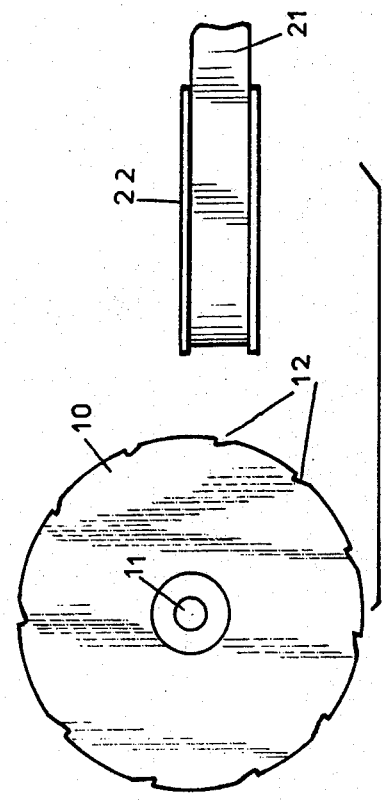

INSTALLATION FOR COATING SUBSTANTIALLY U-SHAPED OR V-SHAPED ARTICLES

The instant invention is related to an installation for coating substantially U-shaped or V-shaped articles, such as hairpins, curlers and similar items.

It is known that it is desirable for articles of the above mentioned kind to be partly coated with a plastic material layer covering the end portions of the said articles, in order to protect the scalp of the user from any wounds that might otherwise be caused by sharp edges or protruding portions of said end portions.

The present invention is aimed at providing a simple installation which allows, in a cheap and efficent manner, a partial coating of the above mentioned kind to be produced on articles such as those defined hereinbefore.

The installation according to the invention makes it possible to apply onto the concerned portions of U or V-shaped articles a powderous plastic material and to melt or fuse said plastic material by the application of heat.

For this purpose, the instant invention provides an installation including treatment stations comprising a coating station at which a powderous plastic material is applied onto those portions of the objects which are to be coated, a heating station at which the said portions of the objects are heated to a temperature at which said powderous plastic material melts, and conveying means for conveying said objects to said stations. The installation according to the instant invention comprises at its inlet end inlet means for introducing in bulk the objects to be coated into said installation, pick-up means for separately picking up said objects one by one, and orienting and feeding means for feeding said objects to said coating station, at least a part of said orienting and feeding means being adapted to mask the remaining portions of said objects, which are not to be coated.

According to a preferred embodiment of the invention said pick-up and feeding means comprise a container having a substantially cylindrical configuration, which is adapted to receive said articles in bulk, and vibrating means adapted to impart to said container a vibrating motion in three directions mutually orthongal, said container having a bottom carrying an inner blade inside of the container near the center of said bottom, said blade being adapted to define a spiral-shaped path extending outwardly at a progressively increasing distance from said center, said spiral-shaped path being continued by a helical path starting at said container bottom and extending upwardly inside said container up to the top end of the latter, said container further comprising an outer blade continuing said upwardly extending helical path by a downwardly directed helical path extending at the outside of the container.

The downwardly directed helical path defined by said outer blade may be connected by means defining a substantially horizontal path to a path defined by a notched wheel which is rotated and adapted to pick up by its notches said articles one by one so that the picked-up articles ride on said notched wheel. A belt provided with mutually spaced magnets cooperates with said notched wheel in such a manner that each individual one of said picked-up articles is attracted at its uppermost portion by a respective magnet and advanced to a feeding device comprising two endless betls, two respective strands of which move in the same direction and are pressed against each other so as to be adapted to receive said articles between said two strands for feeding said articles to said coating and heating stations while exposing only those portions of said articles which are to be coated.

The above-mentioned means defining a substantially horizontal path between said outer blade and said feeding device are preferable constituted by a rod adapted to receive said articles in a riding position, said rod being submitted to a longitudinally directed vibrating motion.

Other objects and features of the instant invention will become apparent from the description herein below with reference to the appended drawing, which shows a preferred embodiment of the invention, that is in no way intended to show all the possible configurations thereof.

FIG. 1 is a side-elevational view of the installation according to the instant invention.

FIG. 2 shows the installation of FIG. 1, viewed from above, the magnet-carrying feeding belt being omitted with a view to simplifying the drawing.

FIG. 3 shows a detail of the horizontal rod and the vibrator associated thereto.

FIG. 4 shows the notched wheel and a detail of the feeding device.

FIG. 5 shows the vibrating container, viewed from above.

FIG. 6 illustrates an article provided with a partial coating obtained by using the installation according the instant invention.

As shown in FIGS. 1 and 2, a container 1 having a substantially cylindrical configuration receives the U or V-shaped articles 2 (Cf. also FIG. 6) which are introduced in bulk into said container. Two curved guide blades 3 are excentrically arranged on the bottom of the container. The container furthermore comprises a helical blade 5 arranged adjacent the inner wall of container 1. This inner helical blade 5 is continued by an outer helical blade 5 surrounding the outer wall of container 1. The latter is mounted on a support 7 associated with a vibrator schematically shown at 30 adapted to impart a vibrating motion in three mutual orthogonal directions, or dimensions, to the container, in such a way that the articles 2 introduced into said container are oriented by blades 3 with a view to being placed onto the inner helical blade 5 in a "riding" position. Under the effect of the vibrating motion of container 1. The articles climb along the helical blade 5 and are transferred, at the uppermost end thereof, to the outer blade 6 which defines a downwardly directed path; the articles 2 will move along said downwardly directed path also under the effect of the above mentioned vibrating motion. When articles 2 leave the outer blade 6, they are received on a rod 8 associated with a vibrator 9 which imparts a vibrating motion to rod 8 in the longitudinal direction, the arrangement being such that the articles 2 which are "riding" on rod 8 are displaced longitudinally under the action of the vibrating motion of the latter. Rod 8 preferably is provided with notches each of which is adapted to receive an article 2, as illustrated particularly in FIG. 1. At the at end of rod 8 which is located opposite container 1 a notched wheel 10 is provided and adapted to be rotated about its axis 11. The notches 12 provided at the periphery of wheel 10 are equally spaced from each other, and each one of notches 12 is adapted to receive an article 2 when the latter leaves rod 8, said articles then being placed in a "riding" position on wheel 10. A feeding or conveying belt 13 carrying magnets 14 is guided and moved in the direction of arrow 15 by two pulleys 16, 17. It will be understood that the direction of the movement of the lower strand of the magnet carrying belt 13 corresponds to the direction of rotation of wheel 10, which latter direction is indicated by arrow 18. Furthermore it should be noted that the distance between any two adjacent magnets 14 corresponds to the distance between any two adjacent notches 12 of wheel 10. The rotational motion of wheel 10 and the motion of belt 13 are synchronized in such a way that each individual notch 12 is locted in front of a magnet 14 when the considered notch reaches the apex of wheel 10. Consequently the article 2 placed in said notch will then be attracted by the corresponding magnet 14 and thus be withdrawn from wheel 10. The articles which are then held at their respective uppermost portions by magnets 14 are displaced, due to the motion of belt 13, towards a feeding device 19 comprising two smooth belts 20, 21 moved and guided by pulleys 22 in the direction of arrows 23; belts 20, 21 are arranged in such a manner that two respective strands 24, 25 of said belts are pressed against each other. Guiding pulleys 26 are provided for maintaining said strands 24, 25 in mutual engagement.

The articles 2 which have been withdrawn from the respective notches 12 of wheel 10 by the magnets 14 of belt 13 are advanced by said magnets so as to be placed between strands 24, 25 which then take over these articles while changing the orientation thereof by imparting to said articles an angular motion of substantially 90° about the respective vertical median axes of the articles.

Belts 20, 21 then displace the articles 2 while masking a portion thereof in such a manner that only the lower end portions to be coated protrude from the lower edges of said belts, the latter feeding the articles to two treatment stations 27, 28 one of which is arranged behind the other, with reference to the direction of displacement of strands 24, 25 of belts 20, 21.

Station 27 is a station for electrostatically coating the article end portions with a powderous plastic material; station 28 is a heating station adapted to heat the thus prepared article end portions to a convenient temperature, to melt, or fuse, the thus applied powderous plastic material.

According to another embodiment of the invention, treatment station 27 is a heating station adapted to heat to a convenient temperature those lower end portions of articles 2, which are to be coated, while station 28 is adapted to apply a powderous plastic material into the thus heated article end portions.

It will understood that in the two above described embodiments a homogeneous coating is obtained on the considered end portions of articles 2. Articles 2 are then displaced by belts 20, 21 into a collecting container 29, and removed from the installation.

The installation preferably includes cooling means for cooling the belts 20, 21. These cooling means (not shown in the drawing) may comprise one or more nozzles adapted to direct a current of cold air toward belts 20, 21.

The installation described herein above allows of obtaining a homogeneous coating which perfectly adheres to the surface of the treated articles, and which eliminates the so-called "post-smoothing" treatment which generally must be effected on articles which have been coated by the conventional fluidized bed technique; indeed articles treated by this latter technique exhibit an extremely rough surface aspect due to the fact that the powder particles which have adhered in the last place to the heated article are only partially fused.

This advantageous result is obtained especially when the treatment station 27 is a heating station adapted to heat the articles to be treated to the desired temperature, while treatment station 28 is a coating station adapted to apply powderous plastic material to said articles by immersing the same in a mass of said powderous plastic material.

It has furthermore been found that the coating obtained by using the above described installation does not necessitate any subsequent machining or similar operation.

The instant invention is of course by no way limited to the embodiments described herein-above and shown in the drawing. Numerous modifications and variants may be made to the invention by any person skilled in the art while remaining within the scope of the invention.

What is claimed is:

1. An improved installation including treatment stations for applying a coating onto substantially U-shaped or V-shaped articles, such as hair curlers or hair pins, said treatment stations comprising a coating station at which a powderous plastic material is applied to those portions of said articles which are to be coated, and a heating station for heating the aforementioned article portions, said installation further comprising feeding means for feeding said articles to said coating and heating stations, the improvement wherein said feeding means comprises a substantially cylindrical container, inlet end means for introducing said articles in bulk to said container, vibrating means for vibrating said container in three mutually perpendicular directions, a spiral shaped blade on the bottom of said container and extending to the wall of said container, a helical path on said wall of said container connected to the spiral shaped blade and extending upward from said container to the top thereof, a downwardly extending helical path on the outside of said container connected to said upwardly extending helical path whereby said articles fed to said container in bulk are moved by said vibrations up the inner wall of said container and down the outer wall thereof along said upward and downwardly extending helical paths, a substantially horizontal notched longitudinally vibrating rod having one end near a lower end of said downwardly extending helical path for receiving and linearly displacing articles transported along said downwardly extending helical path from said one end of said rod to the other end thereof, a rotating wheel having regularly spaced notches at the other end of said rod and aligned therewith for receiving said linearly displaced articles and for regularly spacing and upwardly displacing said articles along a circular path, said separation being in accordance with the separation of said notches on said wheel, an endless moving belt provided with regularly spaced outwardly protruding magnets, a portion of said belt being above and adjacent the highest point of said wheel, the speed of said belt and the separation of said magnets being equivalent to the peripheral speed of said notched wheel and the separation between notches of said wheel, the wheel and belt being synchronously moved to register the magnets and the notches in the wheel whereby said magnets lift said articles from the highest point of the wheel and transport said articles away from said wheel, and a pair of abutting synchronously moving additional endless belts proximate the belt provided with said magnets for receiving said articles carried by said magnets and for transporting said articles to said treatment stations with only those portions of the articles to be coated protruding from said pair of abutting endless belts.

2. The installation of claim 1, wherein said heating and coating stations comprise means for heating said articles and means for dipping and thus heated articles into a mass of powderous plastic material.

3. The installation of claim 1, wherein heating and coating stations comprises means for electrostatically applying the powderous plastic material onto said articles, and means for heating said articles onto which said plastic material has been applied.

* * * * *